United States Patent
Elliott et al.

(10) Patent No.: US 6,297,613 B1
(45) Date of Patent: Oct. 2, 2001

(54) CONTROL OF LINE HARMONICS

(75) Inventors: Patricia Mary Elliott, Pudsey; Howard James Slater, Harrogate, both of (GB)

(73) Assignee: Switched Reluctance Drives Limited, Harrogate (GB)

( * ) Notice: Subject to any disclaimer, the term of this patent is extended or adjusted under 35 U.S.C. 154(b) by 0 days.

(21) Appl. No.: 09/570,861

(22) Filed: May 12, 2000

(30) Foreign Application Priority Data

May 12, 1999 (GB) .................................................. 9911069

(51) Int. Cl.[7] ........................... H02P 5/28; H02P 7/36
(52) U.S. Cl. ........................................................ 318/701
(58) Field of Search .................................... 318/701, 254

(56) References Cited

U.S. PATENT DOCUMENTS

| | | | |
|---|---|---|---|
| 5,461,295 | * 10/1995 | Horst | 318/701 |
| 5,469,039 | 11/1995 | Stephenson et al. | 318/701 |
| 5,767,638 | * 6/1998 | Wu et al. | 318/254 |
| 5,883,490 | 3/1999 | Moreira | 318/807 |

OTHER PUBLICATIONS

Stephenson et al., "The Characteristics, Design and Application of Switched Reluctance Motors and Drives" PCIM '93, Nürnberg, Jun. 21–24, 1993.

Todd, "UC3854 Controlled Power Factor Correction Circuit Design", Unitrode Application Note, Unitrode Product and Applications Handbook 1995–1996.

Pollock, et al., "Acoustic Noise Cancellation Techniques for Switched Reluctance Drives", Transactions on Industry Applications, vol. 33, No. 2, Mar./Apr. 1997.

Sum, "Improved Valley–Fill Passive Power Factor Correction Current Shaper Approaches IEC Specification Limits", PCIM, Feb. 1998.

* cited by examiner

*Primary Examiner*—Burton S. Mullins
(74) *Attorney, Agent, or Firm*—Dicke, Billig & Czaja, P.A.

(57) ABSTRACT

A switched reluctance drive is supplied from a supply. The excitation applied to the phase winding(s) has one or more gaps inserted so that, when the phase currents are summed, the resulting supply current has a reduced harmonic content. The supply may be alternating or direct.

18 Claims, 11 Drawing Sheets

| Harmonic Order n | Maximum Permissible Harmonic Current A |
|---|---|
| Odd Harmonics ||
| 3 | 2.30 |
| 5 | 1.14 |
| 7 | 0.77 |
| 9 | 0.40 |
| 11 | 0.33 |
| 13 | 0.21 |
| $15 \leq n \leq 39$ | 0.15 (15/n) |
| Even Harmonics ||
| 2 | 1.08 |
| 4 | 0.43 |
| 6 | 0.30 |
| $8 \leq n \leq 40$ | 0.23 (8/n) |

Fig 1

Prior Art

Prior Art

Prior Art

Fig 7

Prior Art

| Harmonic | Limit (A) | Measured (A) |
|---|---|---|
| 2 | 1.080 | 0.032 |
| 3 | 2.300 | 1.890 |
| 4 | 0.430 | 0.021 |
| 5 | 1.140 | 0.367 |
| 6 | 0.300 | 0.014 |
| 7 | 0.770 | 0.200 |
| 8 | 0.230 | 0.019 |
| 9 | 0.400 | 0.119 |
| 10 | 0.184 | 0.015 |
| 11 | 0.330 | 0.098 |
| 12 | 0.153 | 0.031 |
| 13 | 0.210 | 0.069 |
| 14 | 0.131 | 0.023 |
| 15 | 0.150 | 0.035 |
| 16 | 0.115 | 0.058 |
| 17 | 0.132 | 0.027 |
| 18 | 0.102 | 0.050 |
| 19 | 0.118 | 0.032 |
| 20 | 0.092 | 0.094 * |
| 21 | 0.107 | 0.021 |
| 22 | 0.085 | 0.223 * |
| 23 | 0.098 | 0.048 |
| 24 | 0.077 | 0.439 * |
| 25 | 0.090 | 0.058 |
| 26 | 0.071 | 0.358 * |
| 27 | 0.083 | 0.029 |
| 28 | 0.066 | 0.085 * |
| 29 | 0.078 | 0.009 |
| 30 | 0.061 | 0.009 |
| 31 | 0.073 | 0.010 |
| 32 | 0.058 | 0.035 |
| 33 | 0.068 | 0.010 |
| 34 | 0.054 | 0.021 |
| 35 | 0.064 | 0.011 |
| 36 | 0.051 | 0.016 |
| 37 | 0.061 | 0.016 |
| 38 | 0.048 | 0.015 |
| 39 | 0.058 | 0.018 |
| 40 | 0.046 | 0.007 |

Fig 8

Prior Art

| Harmonic | Limit (A) | Measured (A) |
| --- | --- | --- |
| 2 | 1.080 | 0.023 |
| 3 | 2.300 | 1.610 |
| 4 | 0.430 | 0.024 |
| 5 | 1.140 | 0.736 |
| 6 | 0.300 | 0.018 |
| 7 | 0.770 | 0.126 |
| 8 | 0.230 | 0.030 |
| 9 | 0.400 | 0.093 |
| 10 | 0.184 | 0.030 |
| 11 | 0.330 | 0.166 |
| 12 | 0.153 | 0.030 |
| 13 | 0.210 | 0.051 |
| 14 | 0.131 | 0.026 |
| 15 | 0.150 | 0.062 |
| 16 | 0.115 | 0.014 |
| 17 | 0.132 | 0.033 |
| 18 | 0.102 | 0.016 |
| 19 | 0.118 | 0.026 |
| 20 | 0.092 | 0.021 |
| 21 | 0.107 | 0.026 |
| 22 | 0.085 | 0.008 |
| 23 | 0.098 | 0.019 |
| 24 | 0.077 | 0.015 |
| 25 | 0.090 | 0.015 |
| 26 | 0.071 | 0.010 |
| 27 | 0.083 | 0.015 |
| 28 | 0.066 | 0.008 |
| 29 | 0.078 | 0.013 |
| 30 | 0.061 | 0.020 |
| 31 | 0.073 | 0.014 |
| 32 | 0.058 | 0.012 |
| 33 | 0.068 | 0.014 |
| 34 | 0.054 | 0.009 |
| 35 | 0.064 | 0.017 |
| 36 | 0.051 | 0.004 |
| 37 | 0.061 | 0.033 |
| 38 | 0.048 | 0.013 |
| 39 | 0.058 | 0.030 |
| 40 | 0.046 | 0.018 |

CONTROL OF LINE HARMONICS

BACKGROUND OF THE INVENTION

1. Field of the Invention

This invention relates to the control of harmonics in the line voltage and current of supplies to electronically controlled equipment. In particular, it relates to switched reluctance drive systems drawing their power from supplies which have limits on harmonic content.

2. Description of Related Art

Electronically controlled equipment is commonly supplied from an AC supply which has a nominally sinusoidal voltage waveform. However the current drawn from the supply by the equipment is frequently non-sinusoidal, due to the nonlinearities within the equipment. The current is generally represented mathematically as a series of sinusoids of different frequencies: the lowest frequency (the fundamental) corresponds to the frequency of the supply and the higher frequencies are known as harmonics. Mathematical tools such as Fourier transforms are routinely used to determine the frequency and magnitude of these components of the current.

Figure 1:
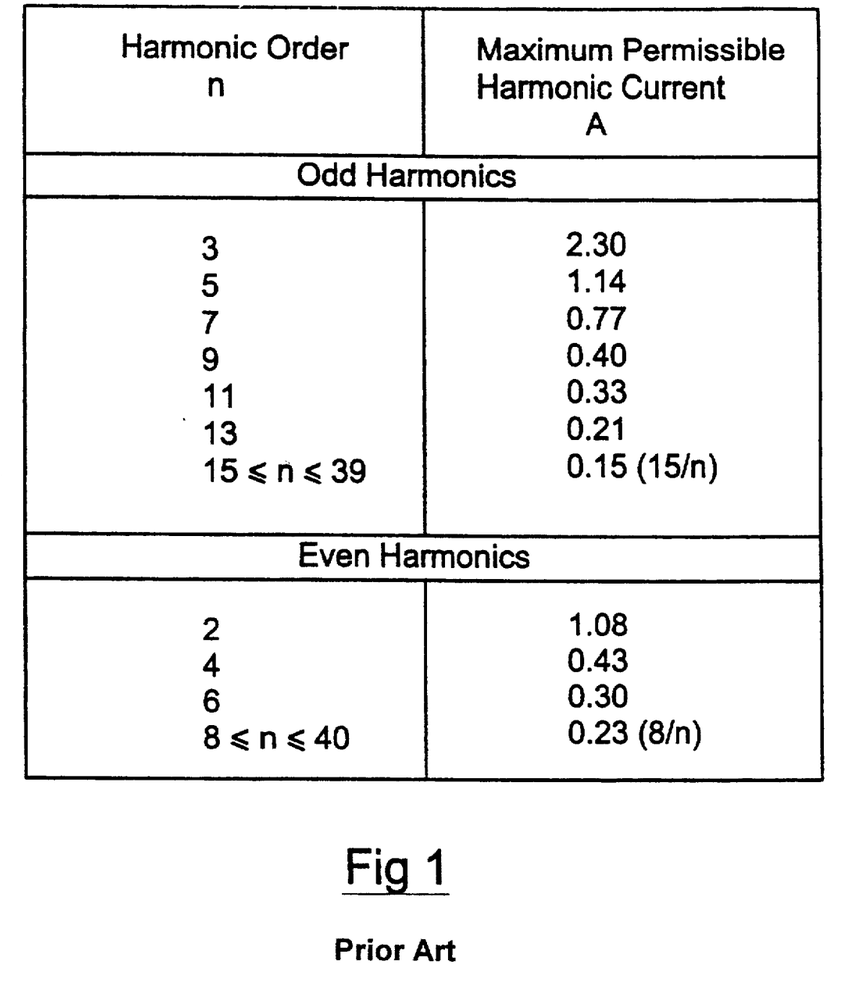
FIG. 1 shows the limits of harmonic currents for certain types of equipment as specified in IEC 1000.

In recent years, the electricity supply companies have become increasingly concerned at the increase in harmonic content of the line current supplied to electronically controlled equipment. Regulations have been implemented to limit the amount of permitted harmonics. For example, in Europe the relevant standard for domestic and light industrial equipment is IEC 1000. FIG. 1 shows the IEC 1000 limits of harmonic content for a domestic appliance operating from a 230V single-phase supply and drawing up to 16A input current. For low-power equipment, say up to 600W as found in a small microwave oven, the conventional practice is to fit a passive filter in the form of a simple line choke (i.e. an inductor) in series with the equipment to suppress the harmonics. This choke presents an increasing impedance to harmonics as the harmonic order rises and is generally designed to be just sufficient to allow the equipment to stay within the permitted levels. However, as the power drawn by the equipment rises, the size and cost of these filters becomes uneconomic and some form of active filtering becomes necessary. Typical active filters for domestic appliances are well known and are discussed in, e.g., "UC3854 Controlled Power Factor Correction Circuit Design", Todd, P.C., Unitrode Application Note U-134, Unitrode Corporation, Merrimack, N.H., USA, which is incorporated herein by reference.

Figure 2:
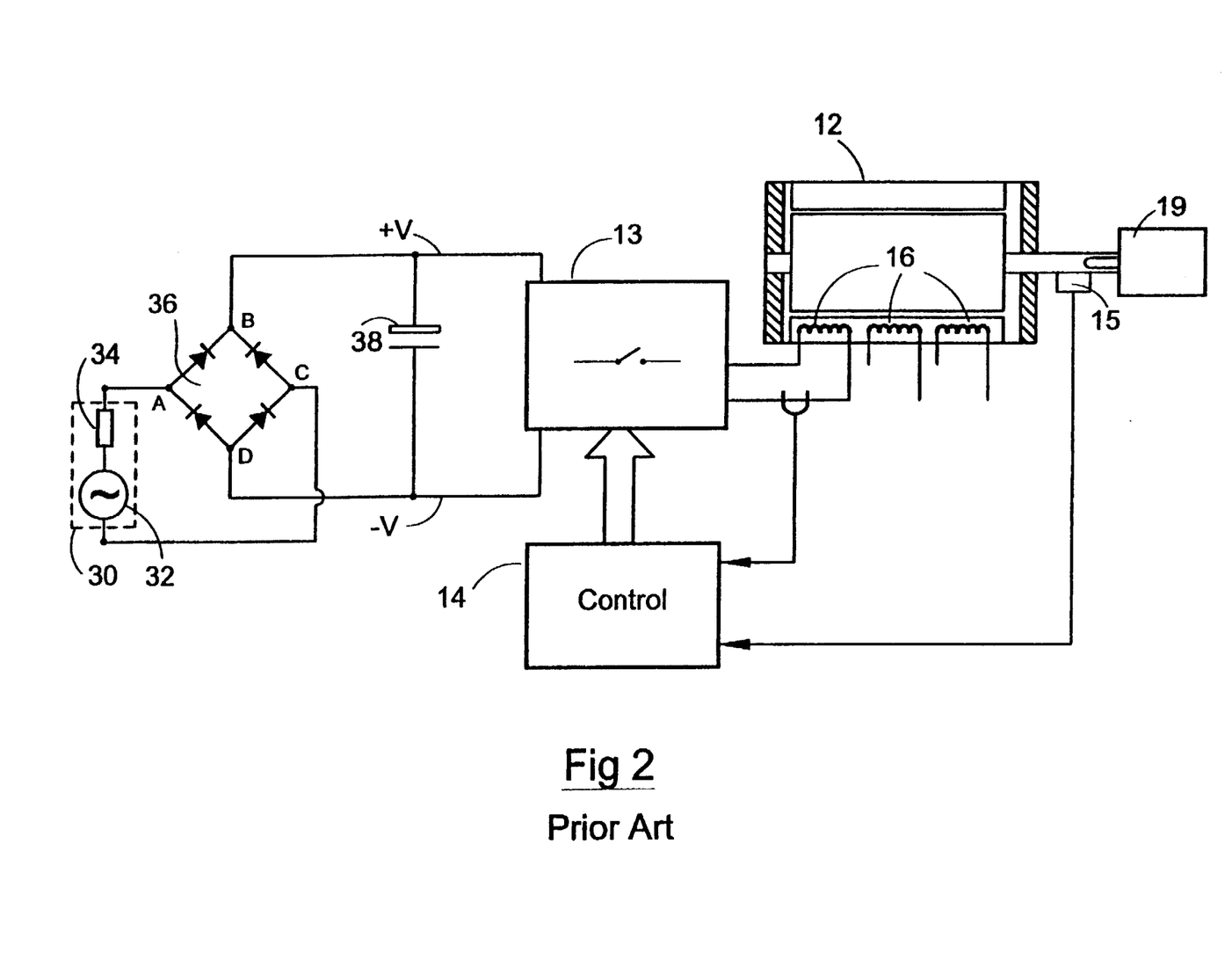
FIG. 2 shows a typical prior art switched reluctance drive.

Switched reluctance machines are increasingly being used in domestic appliances and other relatively low-power applications. The characteristics and operation of switched reluctance machines are well known in the art and are described in, for example, "The characteristics, design and application of switched reluctance motors and drives" by Stephenson and Blake, PCIM '93, Nürnberg, Jun. 21–24 1993 and incorporated herein by reference. FIG. 2 shows a typical switched reluctance drive in schematic form, where the switched reluctance motor 12 drives a load 19. The drive is supplied from a single-phase AC mains supply, shown in FIG. 2 as a voltage source 32 in series with a source impedance 34. In most cases, the impedance is mainly inductive, and this inductance can be increased by adding inductance in series, as described above. The rectifier bridge 36 rectifies the sinusoidal voltage of the source and the output voltage is smoothed by the capacitor 38. The lines marked +V and −V are generally known as the DC link, and capacitor 38 as the DC link capacitor. In the absence of any load on the DC link, the capacitor 38 will charge up on successive cycles of voltage to the peak voltage of the rectifier output. The DC voltage provided by the DC link is switched across the phase windings 16 of the motor 12 by a power converter 13 under the control of the electronic control unit 14. The switching must be correctly synchronized to the angle of rotation of the rotor for proper operation of the drive. A rotor position detector 15 is typically employed to supply signals corresponding to the angular position of the rotor. The output of the rotor position detector 15 may also be used to generate a speed feedback signal.

Figure 3A:
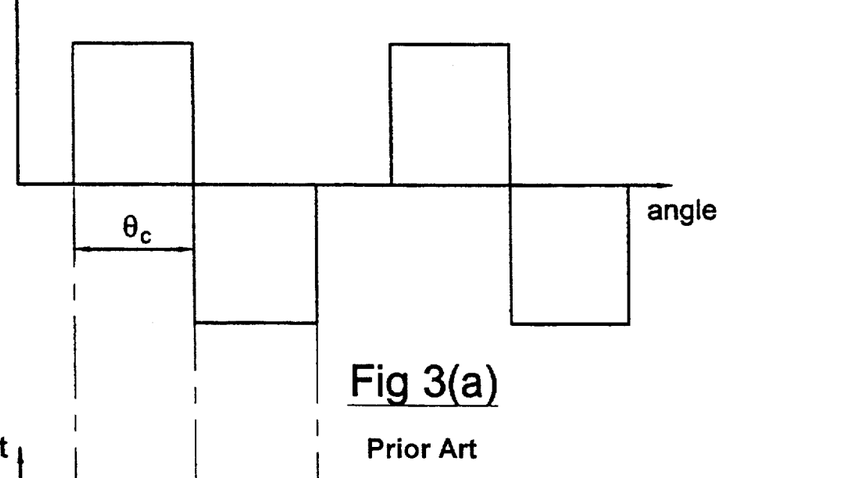
FIG. 3(a) shows the voltage applied to a phase winding of the drive of FIG. 2.
Figure 3B:
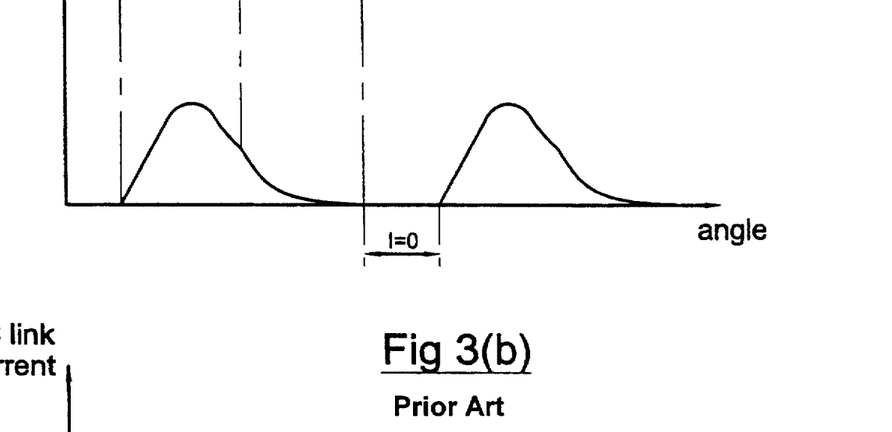
FIG. 3(b) shows the resulting phase current.
Figure 3C:
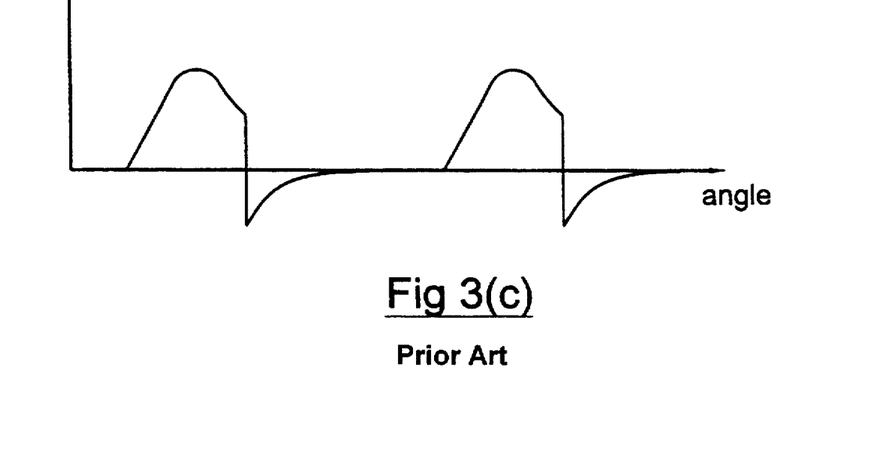
FIG. 3(c) shows the waveform of the current in the DC link.

The switched reluctance drive is essentially a variable speed system and is characterized by voltages and currents in the phase windings of the machine which are quite different from those found in traditional types of machines. FIGS. 3(a)–3(c) illustrate this point. FIG. 3(a) shows the voltage waveform typically applied by the controller to the phase winding. At a predetermined rotor angle, the voltage is applied by switching on the switches in the power converter 13 and applying constant voltage for a given angle $T_c$, the conduction angle. The current rises from zero, typically reaches a peak and falls slightly as shown in FIG. 3(b). When $T_c$, has been traversed, the switches are opened and the action of energy return diodes places a negative voltage across the winding, causing the flux in the machine, and hence the current, to decay to zero. There is then a period of zero current until the cycle is repeated. It will be clear that the phase is drawing energy from the DC link during $T_c$ and returning a smaller amount thereafter. It follows that the DC link needs to be a low-impedance source which is capable of receiving returned energy for part of its operating cycle. FIG. 3(c) shows the current which has to be supplied to the phase winding by the DC link and the current which flows back during the period of energy return.

Figure 4:
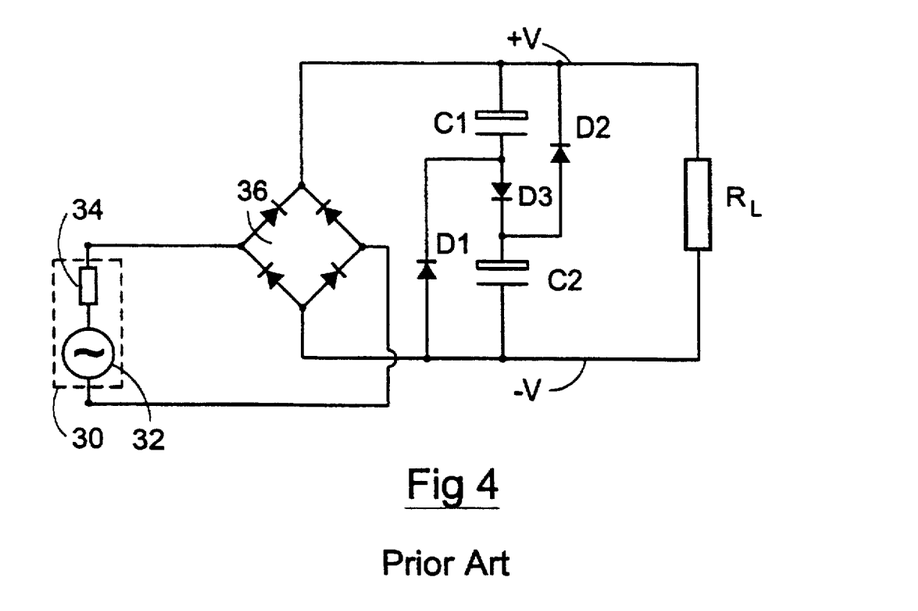
FIG. 4 shows a prior art power factor improvement circuit applied to a load.

The size of the DC link capacitor 38 and the amount of current drawn by the drive clearly interact, and general practice is to size the capacitor so that there is a relatively small amount of droop on the DC link voltage while the capacitor is supplying the load during the periods when the AC supply voltage has fallen below the capacitor voltage. This ensures that the load is operated from an essentially constant voltage. When of an appropriate size, the capacitor is able to supply most of the required higher-order harmonic currents, but gives rise to large amounts of lower-order (i.e. $3^{rd}$ and $5^{th}$) harmonics unless additional filtering is used. This arrangement also has the disadvantage of requiring a large, and therefore costly, capacitor. To mitigate these problems, it is known to use a DC link arrangement which is both economic in capacitor size and has an improved power factor. FIG. 4 shows one such circuit, the "valley-fill" circuit, which can meet both of these requirements. However such circuits are generally poor at supplying the higher order harmonic currents from the capacitors and source these harmonics from the mains supply.

Figure 6:
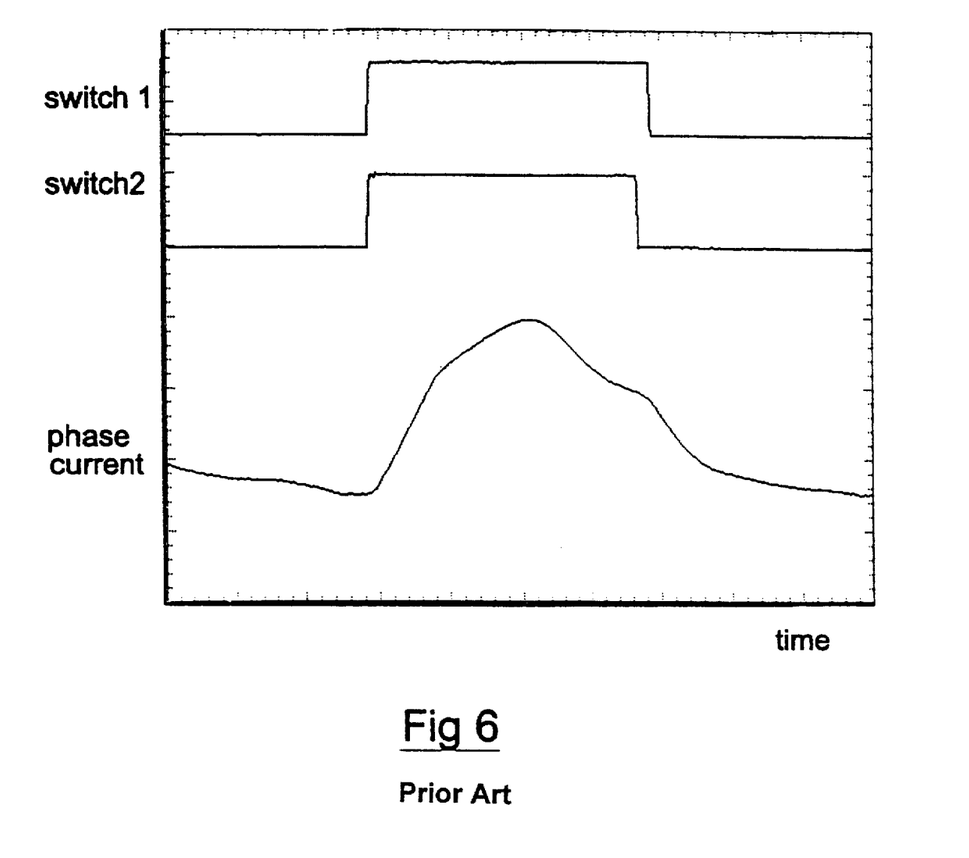
FIG. 6 shows the phase excitation and phase current waveforms of a switched reluctance drive operated in accordance with prior art.
Figure 7:
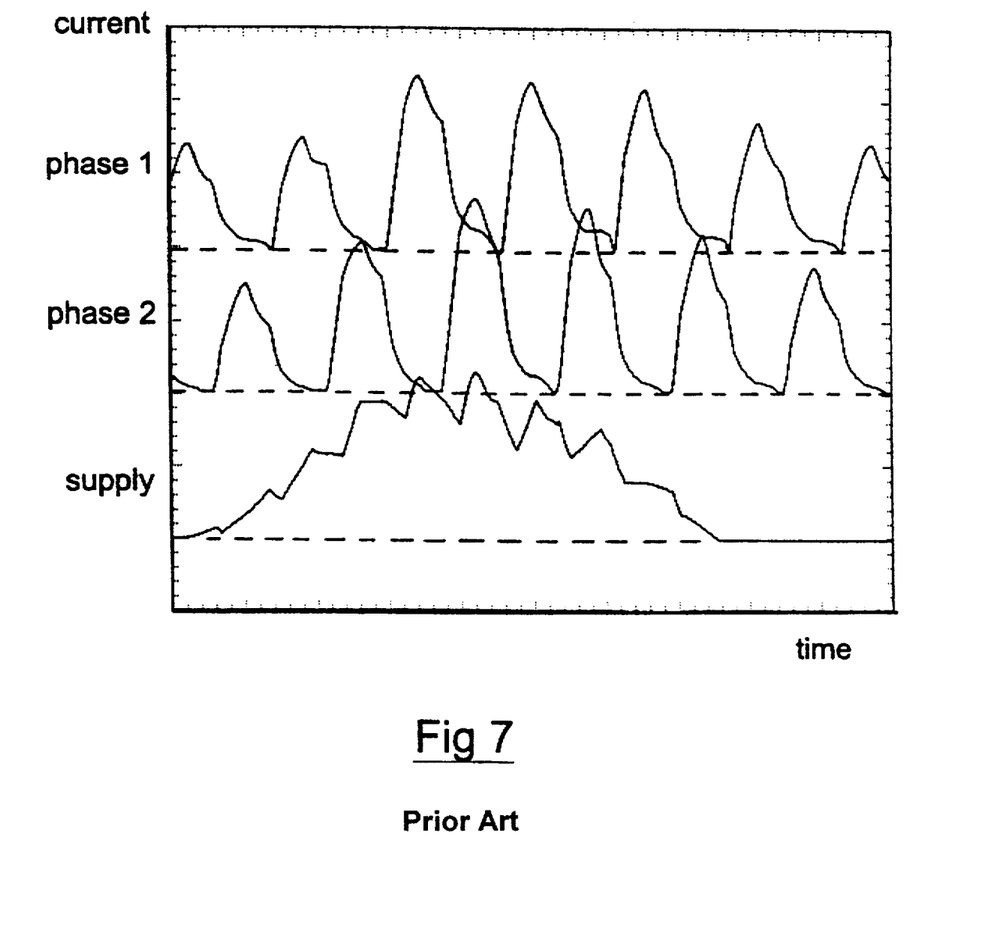
FIG. 7 shows the phase current and supply current waveforms of a 2-phase motor operated in accordance with prior art.
Figure 8:
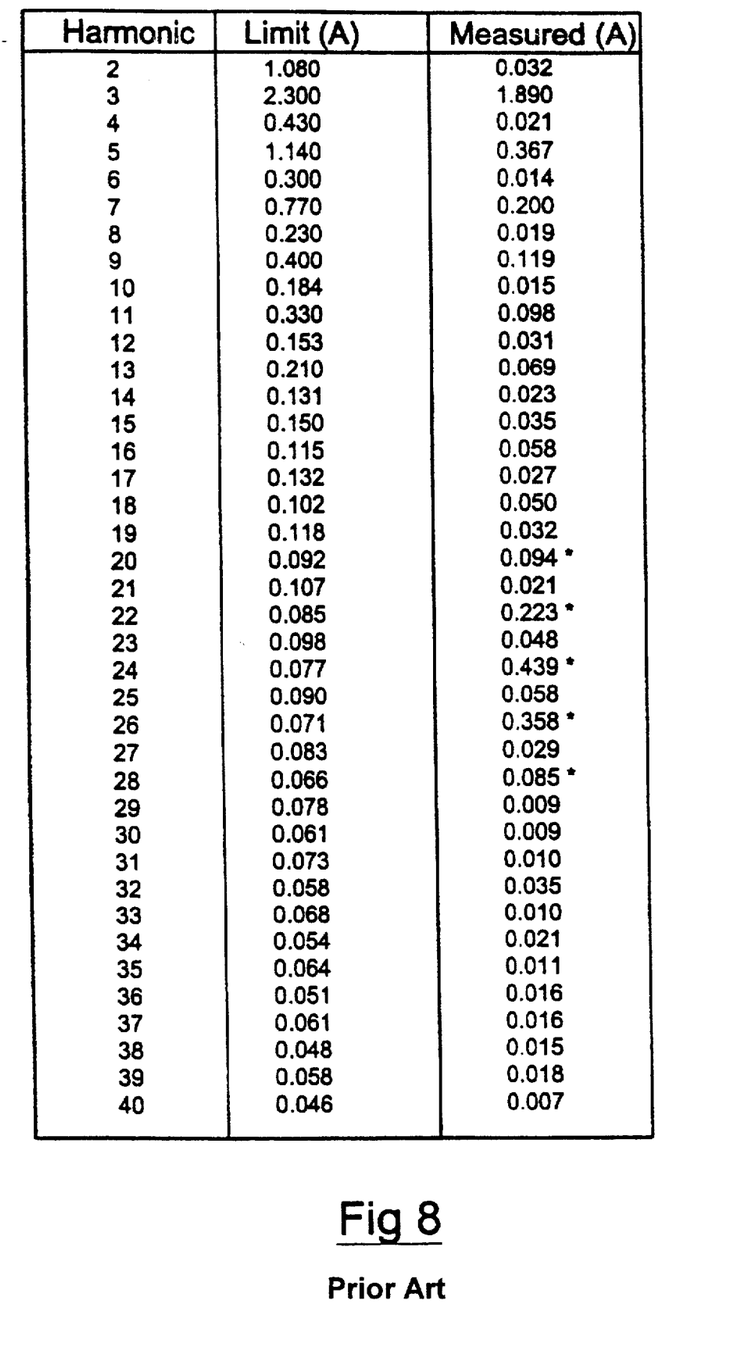
FIG. 8 shows the harmonic analysis of the supply current of FIG. 7.

FIG. 6 shows measurements of the conventionally operated machine running at top speed. The upper two traces show the gate firing signals applied to the two switches of one phase. As will readily be understood by those skilled in the art, the dc bus voltage is applied to the phase winding when both the gate firing signals are high. In this case, the single excitation pulse is shown as occupying around 50% of the cycle time and is followed by a brief period of freewheeling. Because of the valley-fill circuit, the DC link voltage fluctuates, and the particular energization cycle shown corresponds to an instant when the voltage is high, resulting in the machine operating in the continuous current mode, as described in more detail in, e.g., U.S. Pat. No. 5,469,039, incorporated herein by reference. FIG. 7 shows how the two phase currents combine to give the supply current. The figure shows approximately one half cycle of the alternating supply current. It will be realized that the supply current is zero when, by the action of the valley fill circuit, the capacitors supply all the energy to the load. This supply current has a large harmonic content, as shown by its analysis in FIG. 8. This analysis can be done by a number of known methods, commonly using a Fourier transformation implemented by a standard piece of test equipment. FIG. 8 also shows the limits of the harmonics as detailed in FIG. 1, from which it is readily seen that the drive exceeds the permissible limits for the measurements marked with an asterisk (*).

There is a need for a system which has high power factor, draws low harmonic current from the supply and is economical to produce.

SUMMARY OF THE INVENTION

It is an object of this invention to provide a cost-effective, high-power, drive system which can be operated to reduce line harmonics.

According to one aspect of the invention there is provided a method of reducing electrical harmonics in a given bandwidth in the operation of a switched reluctance machine having at least one energizable phase winding, and means for applying an excitation voltage to the at least one phase winding to energize it, the method comprising: removing the excitation voltage to create at least one gap in the energization of the at least one phase winding, the gap having a predetermined duration and a predetermined position within the phase conduction period, such that the power otherwise associated with the harmonics in the given bandwidth is reduced.

The introduction of a gap or gaps is found to cause a modification of the energy distribution in the harmonic content of the supply current. Thus, the invention can be employed to distribute the harmonic content so that the energy of the harmonic components in a bandwidth of interest is reduced.

Preferably, the at least one predetermined gap is created by abrupt removal and restoration of the voltage applied to the at least one phase winding. The gap may be used to freewheel the current so that it recirculates in the at least one phase winding or it can be used to drive the current down by applying a reverse voltage.

When freewheeling, a two switches per phase switching circuit can be used and the switches alternated to share the load between them in creating the gap.

The invention can be operated in single pulse or chopping mode. The supply can be alternating or direct.

BRIEF DESCRIPTION OF THE DRAWINGS

The invention can be put into practice in a number of ways, some of which will now be described by way of example and with reference to the accompanying drawings in which.

DETAILED DESCRIPTION OF PREFERRED EMBODIMENTS

Embodiments of the invention will be described with reference to the switched reluctance drive system shown schematically in FIG. 5. The motor is a two-phase machine, rated at 1500 Watts. The motor windings 16 are supplied from a single-phase 110 Volt AC supply 30. Two capacitors C1 and C2 are connected in series across positive and negative supply rails +V and −V, with a diode D3 connected between them. A rectifier bridge 36 rectifies the sinusoidal voltage which begins to charge the two capacitors C1/C2 when the rising rectified voltage exceeds the voltage of these two capacitors in parallel. A diode D1 is connected to conduct from the negative rail to the anode of the diode D3 and a diode D2 is connected to conduct from the cathode of the diode D3 to the positive rail. Once the rising rectified voltage exceeds the voltage of C1 and C2 in parallel, the voltage between the supply rails substantially follows the rectified mean voltage until the rectified voltage falls below the voltage of the two capacitors in parallel, whereupon the capacitors, acting in parallel, support the voltage between the supply rails. During short periods when the switched reluctance machine is returning energy to the supply rails, the voltage rises and the capacitors charge in series. All of this is explained in more detail in publications on valley-fill circuits, e.g. "Improved valley-fill passive power factor correction current shaper approaches IEC specification limits", PCIM Journal, February 1998, pp. 42–51, Sum, K K. This system further comprises a 2-phase switched reluctance motor, represented by the phase windings 16, coupled to a two-switch-per-phase converter circuit and supplied from the single-phase AC supply. For one phase, switches 71/72 are connected between either side of the winding 16 and the positive and negative rails, respectively. Recirculating diodes 73/74 are connected around the winding in conventional manner. A similar arrangement, involving switches 76/77 and diodes 78/79, is provided for the other phase.

In this particular case, the drive is rated at 1350W input at 19980 rev/min on a 230V ac supply. It is to be understood that the invention is not limited to a 2-phase switched reluctance motor of this particular rating: a reluctance, or a brushless dc machine, of any phase number can be used. As described in the Stephenson paper cited above, a number of alternative converter circuits are available for switched reluctance machines including, without limitation, bifilar single switch, C-dump, H-bridge, etc, all as known to one skilled in the art. Similarly, the DC link circuit need not be a valley-fill circuit, since any other circuit which sources higher-order harmonics from the mains supply could be used. It is also possible to use a 3-phase AC supply. It will be seen that the sub-systems shown in FIG. 5 are chosen merely for the purpose of illustration and are not to be construed as limiting the invention.

Embodiments of the invention control the energization of the machine for each phase by actuation of the phase switches 71/72 and 76/77 in such a manner that the harmonic content of the supply current waveform is controlled. This is achieved by the use of a particular pattern of energization pulses applied to the windings of the machine during a phase conduction period, such that the energy flow around the converter circuit is carefully controlled. The phase conduction period is the duration for which the phase winding is energized as shown by $T_c$ in FIG. 3(a). This is a fraction of the phase period shown, and is defined by the rotor pole pitch. For example, for a switched reluctance machine in the single-pulse mode, instead of the known long excitation pulse typically applied, the excitation pattern consists of smaller pulses of precisely controlled width and position.

It is found that it is predominantly the electrical parameters of the machine which determine the duration and position of the gap or gaps in the excitation voltage. Because the system is complex it is not convenient to calculate or model it accurately. It is found that it is most practicably implemented empirically for a given switched reluctance drive system by running the machine and varying the duration and position of the gap or gaps until an appropriate reduction in line harmonic power is realized. The introduction of a gap or gaps in the energization pulses in a phase conduction period at appropriate points leads to a reduction in the energy associated with the harmonics of concern. It has been speculated that the introduction of a gap or gaps distributes a proportion of the energy to even higher order harmonics which are out of the bandwidth of concern to the electricity suppliers.

Figure 5:
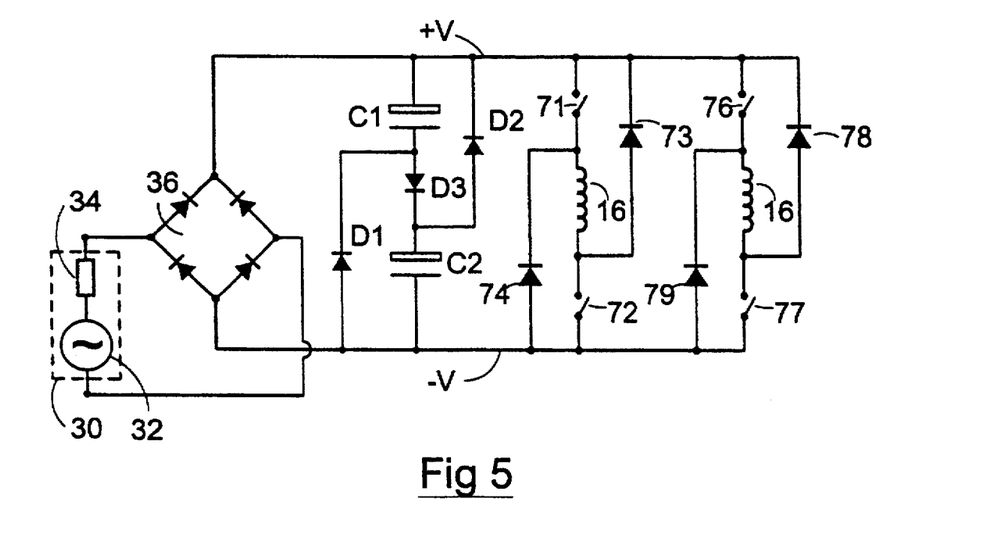
FIG. 5 shows a switched reluctance drive to which the invention may be applied.
Figure 9:
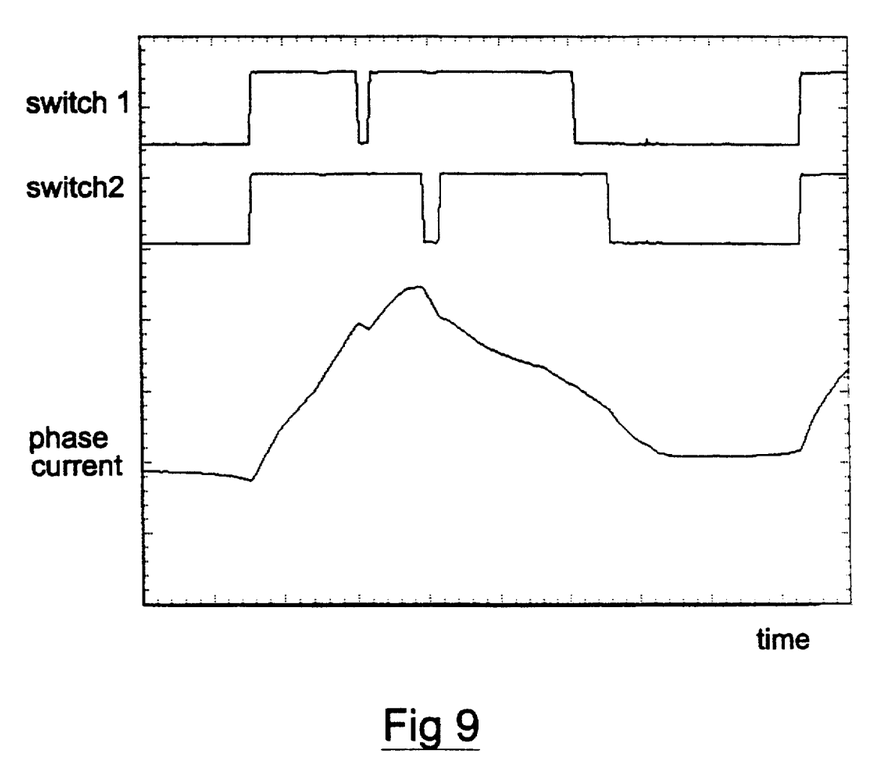
FIG. 9 shows the phase excitation and phase current waveforms of a switched reluctance drive operated in accordance with the invention.

FIG. 9 shows the phase current waveform corresponding to FIG. 6 when the invention is applied to the circuit of FIG. 5. For this drive system, the best excitation pattern comprises three blocks of applied voltage separated by fixed freewheeling gaps of approximately 40 Πsec in a conduction period of approximately 750Πsec. During these gaps, the circuit is made to freewheel by turning off either the upper or the lower switch. In a practical drive, it may be appropriate to alternate the switching between the devices to share the thermal duty, as is shown in FIG. 9. At the end of the excitation period there is a brief period of freewheeling before both switches are switched off, putting the circuit into energy recovery mode. The effect on the phase current waveform of the gaps in the excitation is shown in FIG. 9. The principal effect is to modify the waveform at the points corresponding to the gaps in the excitation. There is also a second-order effect not readily noticeable from FIG. 9, i.e. the power output will fall slightly, because the volt second product of the excitation is slightly reduced. This is readily compensated by slightly increasing or advancing the excitation pulse to restore the output of the machine to its desired level.

Figure 10:
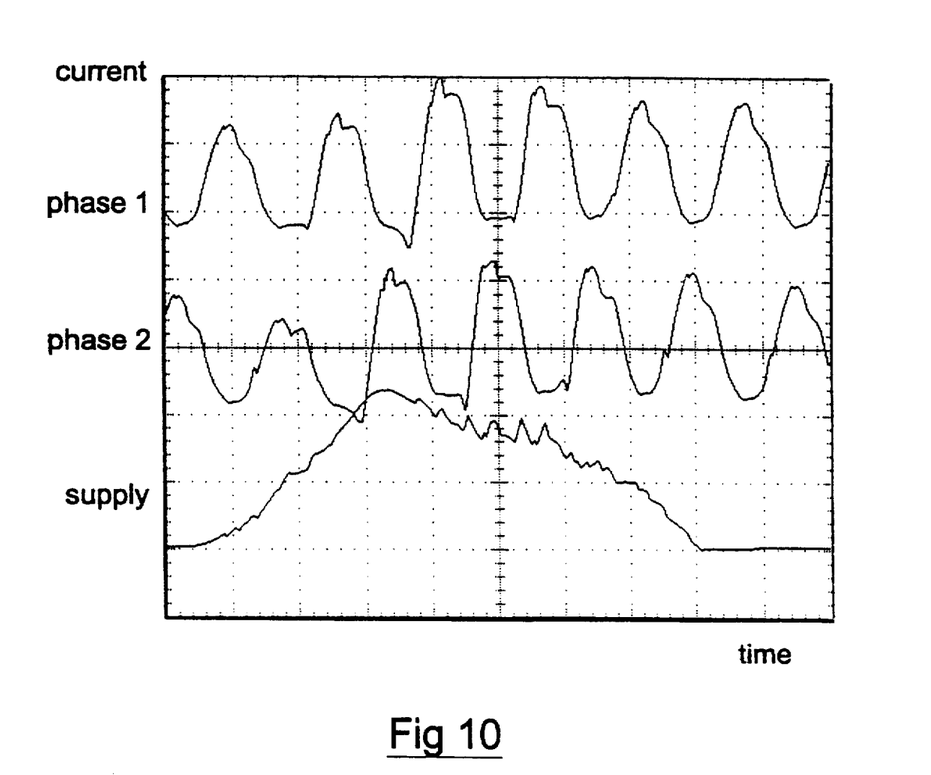
FIG. 10 shows the phase current and supply current waveforms of a 2-phase motor operated in accordance with the invention.
Figure 11:
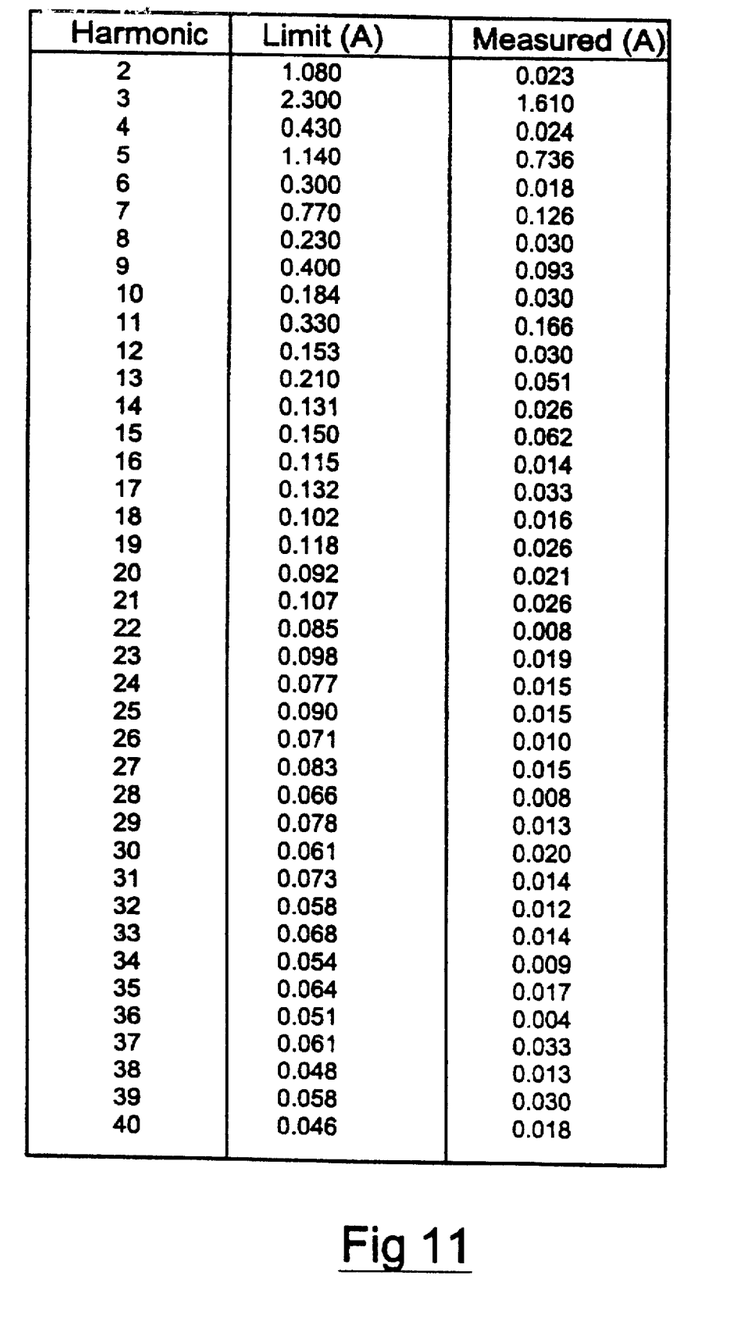
FIG. 11 shows the harmonic analysis of the supply current of FIG. 10.

FIG. 10 shows the two phase current waveforms adding together to give the supply current waveform. This should be compared with FIG. 7, and is seen to be generally smoother overall. The harmonic content of this supply current is given in FIG. 11, where it is seen that the drive now meets the permissible limits.

In this particular example, two brief interruptions in the applied voltage, providing periods of freewheeling, are inserted into the main excitation pulse. In other drives, a single period may be sufficient, whereas in still further drives, three or more freewheeling periods may be required. In some drives it may be found preferable to switch both switches off to create the interruption, rather than just one as discussed above. In this case the winding current is not allowed to freewheel but decays rapidly under the influence of the reversed voltage. In all of these variants, however, the common feature is the insertion of one or more gaps in the phase excitation voltage in order effectively to reduce the harmonic content of the supply current.

The width and position of the gaps are critical to the performance of this method and could be determined from simulation (when a sufficiently accurate circuit model of the drive is available) or from experimentation on a particular drive. Both the width and position of the gap(s) may be speed- and/or load-dependent. Thus, in some applications it is appropriate to store the parameters of the excitation pattern in a look-up table and to read them out at appropriate times. The skilled person will realize that this can be done in the same way as is conventionally done for the firing angles which determine the width and position of the main excitation pulse.

The illustrative embodiment described above uses a 2-phase switched reluctance drive, but any higher phase number could also be used, since the increased number of phases allows greater freedom in adding interruptions to modify the phase currents to achieve the desired effect of reduced supply harmonics. Similarly, the switched reluctance machine has been shown operating in the single-pulse mode, though it is possible to apply the same technique to a machine operating in the chopping mode with the same beneficial results, though it will be found preferable in this case to use a chopping scheme which is frequency controlled rather than frequency wild.

Figure 12:
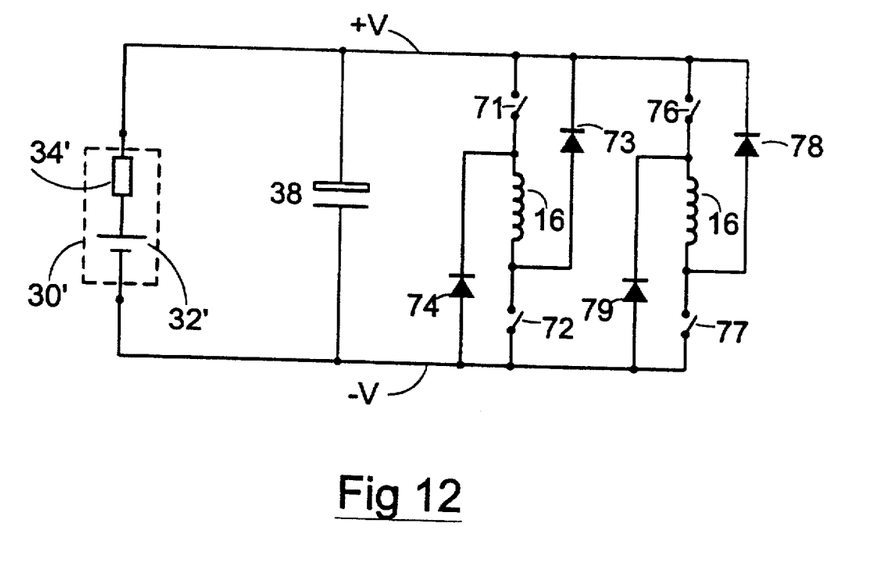
FIG. 12 shows a switched reluctance drive incorporating the invention and supplied from a direct supply.

The above embodiments have been described with reference to an alternating supply, since this is the most common form of supply. However, it will be recognized that the invention is also applicable to time-invariant, i.e. direct, supplies, e.g., a battery. FIG. 12 shows a drive operated from such a supply, in which the supply 30' is represented by an ideal direct current source 32' and an impedance 34'. The capacitor 38 is normally sized to source the alternating component of the current supplied to the drive. By inserting gaps in the excitation voltage as described above, the harmonic content of the current can be controlled and hence the size of the capacitor 38 can be optimized.

The skilled person will appreciate that variation of the disclosed arrangements is possible without departing from the invention. Accordingly, the above description of several embodiments is made by way of example and not for the purposes of limitation. It will be clear to the skilled person that minor modifications can be made to these embodiments without significant changes to the operation described above. The present invention is intended to be limited only by the spirit and scope of the following claims.

What is claimed is:

1. A method of reducing harmonics of a supply current in a given bandwidth in the operation of a switched reluctance machine having at least one energizable phase winding and means for applying an excitation voltage to the at least one phase winding to energize it, the method comprising:

removing the excitation voltage to create at least one gap in the energization of the at least one phase winding, the at least one gap having a predetermined duration and a predetermined position within the phase conduction period, such that the magnitude otherwise associated with the harmonics in the given bandwidth is reduced.

2. A method as claimed in claim 1 in which the at least one gap is created by abrupt removal and restoration of the voltage applied to the at least one phase winding.

3. A method as claimed in claim 1 in which current in the at least one phase winding is allowed to freewheel during the at least one gap.

4. A method as claimed in claim 1 in which the means for applying includes a two-switches-per-phase switching circuit, the method further including alternating the actuation of the switches to create the at least one gap.

5. A method as claimed in claim 1 in which the means for applying includes a two-switches-per-phase switching circuit, the method further including actuating the switches substantially simultaneously to create the at least one gap.

6. A method as claimed in claim 1 in which the machine is operating in a single pulse mode.

7. A method as claimed in claim 1 in which the machine is operating in a chopping mode.

8. A method as claimed in claim 1 in which the excitation voltage is derived from an alternating supply.

9. A method as claimed in claim 1 in which the excitation voltage is derived from a direct supply.

10. A method of determining the duration of the at least one gap in the excitation voltage for the method of reducing harmonics as claimed in claim 1, the method including:

operating the switched reluctance machine by controlling the excitation voltage;

introducing at least one gap in the excitation voltage; and varying the duration and/or position of the gap in the phase conduction period until the magnitude associated with the supply current harmonics in the given bandwidth is reduced.

11. A switched reluctance machine having a supply current, the machine comprising:

at least one energizable phase winding;

means for applying an excitation voltage to the at least one phase winding to energize it; and means for removing the excitation voltage to create at least one gap in the energization of the at least one phase winding, the at least one gap having a predetermined duration and a predetermined position within the phase conduction period, such that the magnitude otherwise associated with harmonics in a given bandwidth of the supply current is reduced.

12. A machine as claimed in claim 11 in which the at least one gap is created by abrupt removal and restoration of the voltage applied to the at least one phase winding.

13. A machine as claimed in claim 11 in which current in the at least one phase winding is allowed to freewheel during the at least one gap.

14. A machine as claimed in claim 11 in which the means for applying includes a two-switches-per-phase switching circuit, actuation of the switches being alternated to create the at least one gap.

15. A machine as claimed in claim 11 in which the means for applying includes a two-switches-per-phase switching circuit, the switches being actuated substantially simultaneously to create the at least one gap.

16. A switched reluctance machine having a supply current, the machine comprising:

at least one energizable phase winding; and a switching arrangement for applying an excitation voltage to the at least one phase winding to energize it;

wherein excitation voltage is removed to create at least one gap in the energization of the at least one phase winding, the at least one gap having a predetermined duration and a predetermined position within the phase conduction period, such that the magnitude otherwise associated with harmonics in a given bandwidth of the supply current is reduced.

17. A machine as claimed in claim 16, wherein the switching arrangement comprises two switches per phase of the machine, actuation of the switches being alternated to create the at least one gap.

18. A machine as claimed in claim 16, wherein the switching arrangement comprises two switches per phase of the machine, the switches being actuated substantially simultaneously to create the at least one gap.

* * * * *